(12) United States Patent
Hirt

(10) Patent No.: US 6,712,189 B2
(45) Date of Patent: Mar. 30, 2004

(54) TORQUE TRANSFER DEVICE WITH RELEASE MECHANISM

(75) Inventor: Gunter Hirt, Kongsberg (NO)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/219,052

(22) Filed: Aug. 14, 2002

(65) Prior Publication Data

US 2003/0051965 A1 Mar. 20, 2003

Related U.S. Application Data

(63) Continuation of application No. PCT/DE01/00182, filed on Jan. 16, 2001.

(30) Foreign Application Priority Data

Feb. 15, 2000 (DE) .......................................... 100 06 541

(51) Int. Cl.[7] ............................................. F16D 21/00
(52) U.S. Cl. ...................................... 192/84.6; 74/330
(58) Field of Search ............................... 192/48.4, 48.8, 192/84.6; 74/330

(56) References Cited

U.S. PATENT DOCUMENTS

| | | | | |
|---|---|---|---|---|
| 4,489,622 A | * | 12/1984 | Underwood | 74/330 |
| 4,611,698 A | * | 9/1986 | Lehmann | 192/48.9 |
| 5,613,401 A | * | 3/1997 | Maurizio | 74/330 |
| 5,839,561 A | * | 11/1998 | Koda et al. | 192/84.5 |
| 6,044,719 A | * | 4/2000 | Reed et al. | 74/330 |
| 6,105,743 A | * | 8/2000 | Salecker et al. | 192/84.6 |
| 6,209,406 B1 | * | 4/2001 | Sperber et al. | 74/330 |

* cited by examiner

Primary Examiner—Rodney H. Bonck
(74) Attorney, Agent, or Firm—Darby & Darby

(57) ABSTRACT

The invention relates to torque transmission device comprising at least one first clutch device which is provided with at least one clutch operator and at least one actuating device. The inventive device also comprises a drive device which generates a drive signal that is transmitted to the actuating device.

44 Claims, 9 Drawing Sheets

TORQUE TRANSFER DEVICE WITH RELEASE MECHANISM

CROSS-REFERENCE TO RELATED APPLICATION

This is a continuation of international application No. Serial No. PCT/DE01/00182, filed Jan. 16, 2001, which is hereby incorporated by reference in its entirety.

TECHNICAL FIELD

The invention relates to a torque transfer device with at least one first clutch device which has at least one release mechanism and at least one actuating device as well as at least a drive device.

BACKGROUND

A torque transfer device is in the sense of the present invention in particular a device which can convert at least a rotary characteristic of at least one rotationally movable input part, such as input shaft into at least one identical or different rotary characteristic of at least one output part, such as output shaft, wherein the torque transfer device can be shifted in particular into different shift positions. These different shift positions are designed in particular so that in at least one shift position the rotary characteristic is transferred unchanged and/or in at least one shift position the rotary characteristic is not transferred and/or in at least one shift position the rotary characteristic is transferred in modified form. The torque transfer device has in the sense of the present invention in particular a clutch device and/or transmission device and/or torque converter device.

By rotary characteristic is meant in the sense of the present invention in particular a characteristic value which describes the rotational status of a rotationally movable component part, such as torque or speed.

By clutch device in the sense of the present invention is meant in particular a device which can be shifted into different shift positions and which can transfer a signal wherein in different shift positions the ratio of at least one input signal which is in particular a force or torque is different from at least one output signal and wherein preferably different shift positions can be switched in which the power transfer through the clutch device is different and wherein in particular a force or torque can be transferred by the clutch whereby the part of the force or torque being transferred can be changed. Preferably the clutch device has at least a first shift position in which it transfers a signal substantially identically and/or at least a second shift position in which it transfers a signal at least in part and/or at least a third shift position in which it basically does not transfer any input signal.

The clutch device can be designed with or without a power branch and in particular can have a friction clutch or starting clutch or turning set clutch or multi plate clutch or magnetic powder clutch or converter lock-up clutch or a claw clutch or an automated clutch or other clutch. The clutch device can be controlled electronically or in any other way.

A transmission device in sense of the present invention is designed in particular as a shift gear or automated shift gear or as a continuously variable gear or manual shift gear or in any other way.

The transmission device is particularly preferably designed as a power shift transmission.

Devices which can transfer torque and in particular those which are designed as power shift gears are already known.

SUMMARY

The object of the invention is to provide a differently designed device which can transfer torque.

According to a particular aspect the object of the invention is to shorten the release path of a torque transfer device, and in particular a clutch device, namely in particular without impairing the function or comfort.

According to a particular aspect the object of the invention is to reduce the release path of the power shift clutch, wherein in particular the comfort and functional behaviour are not to be impaired.

According to a particular aspect the object of the invention is to provide a cost-effective structurally simple and operationally reliable torque transfer device.

This is achieved through a torque transfer device which has at least one further feature from the features described in the following description or the following claims or is shown in the drawings.

The object of the invention is also achieved by a torque transfer device according to claim 1 or claim 2 or claim 3 or claim 4.

The object is further achieved through a control device for controlling a torque transfer device.

Preferred embodiments of the invention form the subject of the sub-claims.

According to the invention a torque transfer device is provided with at least one first clutch device wherein this first clutch device has at least one release mechanism and at least one actuating device as well as at least one drive device.

By drive device is meant in the sense of the present invention in particular a device which can convert at least one first energy form, input energy form, into at least one second energy form, an output energy form, wherein the output energy form can be used to actuate component parts or the like. The drive device has in the sense of the present invention in particular an electric motor or the like.

By release mechanism is meant in the sense of the present invention in particular a device which has a component part coupled to an input shaft and a component part coupled to an output shaft, which can be moved relative to each other and in different relative positions create a different force or torque transfer between these component parts, wherein this different force or torque transfer is effected in that the engagement status between these component parts is designed differently and wherein these component parts are in direct contact in particular in at least one relative position. The release mechanism preferably has a housing and/or a stop and/or a clutch cover and/or a clutch disc and where applicable a contact pressure plate and/or a resetting spring mechanism and/or a release lever.

It is particularly preferred if the release mechanism of a clutch mechanism is designed so that at least one clutch disc is arranged in the axial direction between a stop coupled in one or more parts to a clutch cover on one side, and a contact pressure plate on the other side wherein the contact pressure plate is arranged movable relative to the clutch disc and to the stop and can load the clutch disc so that the friction force is increased in the circumferential direction between the stop and the at least one clutch disc or between the clutch discs and between the at least one clutch disc and contact pressure plate. Particularly preferably the release mechanism furthermore has a release lever which can load and relax the contact pressure plate. Preferably this release lever is loaded by an actuating device and is supported where necessary against the clutch cover whereby the force engagement point of this release lever on the contact pressure plate is disposed between the force engagement point of this release lever on the clutch cover and the force engagement point of this release lever on the actuating device.

In the sense of the present invention by release mechanism is meant in particular a device which has the component part or only the component parts which with a predetermined operating load determine the maximum release path of this release mechanism, namely in particular as a result of the elastic properties of these relevant component parts.

The release path of the torque transfer device or clutch device is thereby a predetermined path section or a predetermined path position along a predetermined path section along which a predetermined component part or a predetermined point or region of a predetermined component part can be moved or move during actuation of the release mechanism. The release path is in particular measured at a predetermined point of a release lever such as the coupling point for the actuating device or at a predetermined point of the contact pressure plate or at any other point. Particularly preferably the coupling point between the release mechanism and the actuating device is a point at which a release lever bears on a release bearing.

The actuating device which is preferably designed to be hydraulic and/or pneumatic and/or mechanical and/or electrical and/or electromagnetic generates an actuating signal such as force which it forwards to the release mechanism. This actuating signal has the effect that under first predetermined conditions the release mechanism is shifted into another or different shift position. These first predetermined conditions are in particular designed so that the type and/or identity of the actuating signal, more particularly the value of an actuating force is designed so that a change between the different shift positions is possible. Under second predetermined conditions the actuating signal has the effect where necessary that the release mechanism is held in a predetermined shift position or remains in a predetermined shift position.

By holding a shift position is meant in particular in the sense of the present invention that the effect is that the shift position is not changed. To this end a predetermined holding load can be applied or a relaxing action can be effected.

The torque transfer device has a drive device which is designed electric and/or pneumatic and/or hydraulic and/or mechanical and/or electromechanical or in another way and generates a drive signal which is forwarded to the actuating device so that the actuating device generates an actuating signal in dependence on this drive signal.

The actuating device is preferably designed so that it converts a force introduced from the drive device or a torque introduced from the drive device into a force or torque with which the release mechanism is loaded whereby if necessary inside the actuating device forces are only transferred in the linear direction. It is thereby proposed in particular that the interface between the drive device and actuating device is designed so that the linear force transfer inside the actuating device is ensured. It should be pointed out that the actuating device and the drive device can also be configured differently, namely in particular so that torque can be transferred inside the actuating device or in any other way.

According to the invention it is proposed that a first overall elasticity of the actuating device and/or a second overall elasticity of the drive device and/or a third overall elasticity of the unit comprising the actuating device and the drive device amount(s) to at least 50% of a fourth overall elasticity of the release mechanism.

By overall elasticity of a device, more particularly the actuating device or drive device or the complete unit of actuating device and drive device or release mechanism is meant in the sense of the present invention in particular the elasticity which is provided between two or each two signal transmission points of this device wherein at these signal transmission points a signal is introduced into this device or a signal is emitted from this device. These signals are in particular forces so that the overall elasticity indicates the elastic behaviour of the device between two or each two force transfer points of adjoining component parts. The overall elasticity of a device is in particular determined through the individual elasticities of the component parts or other media such as hydraulic fluid or gas of this device through which a signal, more particularly a force is transferred within the device.

In the sense of the present invention this stretch along which the signal is transferred through the device, is called in particular a signal transfer stretch. The signal transfer stretch of a predetermined device is thus in particular the stretch along which a signal is transferred through the device between at least two signal transfer points to adjoining component parts. The signals introduced into the device or emitted or discharged from the device are in particular forces where for this case the signal transfer stretch is also called force transfer stretch.

As signal transfer stretch of the release mechanism, in the sense of the present invention is designed in particular the stretch of the release mechanism along which a signal is transferred inside the release mechanism when a signal is introduced from the actuating device into the release mechanism or vice versa, which has the effect that the shift position of the release mechanism is changed. Of the one torque transfer device designed as a clutch device the signal transfer stretch of the release mechanism is designed in particular so that a signal from the actuating device is introduced at a predetermined point into a release lever, forwarded through this release lever to a signal transfer point through which a signal is passed on through a contact pressure plate to one or more clutch discs and from these clutch discs to a stop, such as housing. In the sense of the present invention the signal transfer stretch can in particular also be formed at least in part as a parallel shift circuit so that in the event of a torque transfer device designed as a clutch device a signal can be transferred through a resetting spring to a stop in particular parallel to the signal transferred between the contact pressure plate and a stop.

As signal transfer stretch of the actuating device in the sense of the present invention is designed in particular the stretch inside the actuating device along which a signal is transferred between at least one signal transfer point between the drive device and the actuating device on one side and at least one signal transfer stretch between the actuating device and release device on the other hand.

By signal transfer stretch of the drive device is meant in the sense of the present invention in particular a stretch along which a signal is transferred inside the drive device to the signal transfer point between the drive device and the actuating device.

It should be pointed out that the term stretch in the sense of the present invention is to be widely interpreted and in particular is not only to mean stretches in the mathematics sense, but also linear connecting lines between two end points.

In the following the invention will be explained with reference to forces which are transferred along force transfer stretches through the relevant devices and which are transferred to force transfer points between adjoining component parts. The invention is not to be restricted to signals which are forces.

The overall elasticity of the release mechanism is in particular the elasticity which is provided along the force transfer stretch of the release mechanism or which indicates the elastic behaviour of the release mechanism which is given when a force is transferred along the force transfer stretch of the release mechanism.

The overall elasticity of the actuating device is in particular the elasticity of the actuating device along the force transfer stretch of the actuating device, thus in particular between a force transfer point between the actuating device and the drive device on the one hand and the force transfer point between the actuating device and release device on the other hand.

The overall elasticity of the drive device is in particular the elasticity of the drive device which is provided between a predetermined point of the force transfer stretch and the force transfer point between the actuating device and the drive device. The point of the force transfer stretch of the drive device is thereby in particular the spot on the force transfer stretch at which, seen in the direction of the actuating device, a mechanical signal such as force is provided for the first time.

The term of rigidity of a component part or medium or device is used in the sense of the present invention in particular in relation to component parts or devices or media which are a constituent part of the release mechanism or the actuating device or the drive device wherein these component parts are disposed in the force transfer stretch of the drive device or actuating device or release mechanism or are disposed outside of this force transfer stretch and wherein the elasticity of these component parts influences the elasticity along the force transfer stretch or between two force transfer points.

By overall elasticity of the unit comprising the drive device and actuating device is meant in the sense of the present invention in particular the elasticity which is provided between two points or each two points which define the force transfer stretch through the drive device and the actuating device.

According to a particularly preferred embodiment of the invention the overall elasticity of the drive device and/or actuating device and/or unit of drive device and actuating device amount to at least 55%, preferably at least 60%, preferably at least 65%, preferably at least 70%, preferably at least 75%, preferably at least 80%, preferably at least 100%, preferably at least 130%, preferably at least 130%, preferably at least 170%, preferably at least 200% of the overall elasticity of the release mechanism.

The object of the invention is further achieved through a torque transfer device according to claim 2.

According to the invention it is proposed that the actuating device or the drive device has at least one elastic device which has the effect that the overall elasticity of the actuating device and/or overall elasticity of the drive device and/or the overall elasticity of the unit comprising the actuating device and drive device is increased.

An elastic device can thereby be solid, fluid or gaseous or can have a combination of different component parts or media of different aggregate states.

The elastic device is shifted in series or parallel in the force transfer stretch of the actuating device or drive device or branches off from this force transfer stretch or is disposed in some other way.

The object of the invention is further achieved through a torque transfer device according to claim 3.

According to the invention it is proposed that inside the force transfer stretch of the actuating device or drive device or branching off from at least one of these force transfer stretches at least one elastic device is provided whose elasticity amounts to at least 120%, preferably at least 140%, preferably at least 160%, preferably at least 190%, preferably at least 200%, particularly preferably at least 250%, particularly preferably at least 300%, particularly preferably at least 500% of the elasticity of a component part adjoining this device or this component part which is mounted along the force transfer stretch. This adjoining component part can be switched in series or in parallel or can be a component part or device which is disposed inside the force transfer stretch and adjoins a branch point which is adjoined by this elastic component part or this elastic device, where necessary coupled through intermediate elements.

The object is further achieved through a torque transfer device according to claim 4.

According to the invention it is proposed that inside the actuating device or inside the drive device there is at least one elastic device whose elasticity is greater than the overall elasticity of the actuating device or the overall elasticity of the drive device or the overall elasticity of the unit consisting of the actuating device and drive device wherein this elastic device is disposed in the force transfer stretch of the actuating device of the drive device or branches off from one of these force transfer stretches, where necessary coupled through intermediate elements.

The elastic device or the elastic component part is formed in one or several pieces.

Preferably the torque transfer device has at least a second clutch mechanism. Preferably the torque transfer device has at least a third clutch device.

It is particularly preferred if the torque transfer device has exactly one first clutch device, exactly one second clutch device and several third clutch devices.

A preferred torque transfer device according to the invention is formed as a power shift transmission with clutch device or has a power shift transmission. This power shift transmission is preferably designed so that wheels are arranged on at least two shafts and in different shift positions of the power shift transmission a torque can be transferred between these shafts through different wheel combinations wherein at least one part of these shift positions is differentiated through the relevant transmission ratio between these shafts. At least one of these transmission stages which is designated the power shift transmission stage is designed so that through this transmission stage a torque can only be transferred between a vehicle drive device of a vehicle having a torque transfer device according to the invention, and a vehicle drive axle when the first clutch device is closed at least in part, thus a where necessary restricted torque can be transferred. Through at least two further transmission stages which are disposed between the at least one first shaft and the at least one second shaft it is then only possible to transfer torque between a drive device of the vehicle, such as combustion engine, and a drive axle of the vehicle when at least one third clutch device dedicated to this transmission stage is shifted into an at least partly closed shift position, thus can transfer torque. It is thereby particularly preferred if at least two different transmission stages are associated with one common third clutch device wherein this third clutch device is designed so that in different shift positions it enables torque transfer between the motor vehicle drive device and the drive axle through different transmission stages.

It should be pointed out that the torque transfer device according to the invention is provided preferably for vehicles whereby the invention is however not restricted just to use in motor vehicles.

The power shift transmission device or torque transfer device is preferably designed so that during shifting between different shift positions associated with transmission stages arranged between the at least one first and the at least one second shaft, torque can be transferred from the torque transfer device, namely in particular between a vehicle drive device and a vehicle drive axle. This torque flow flows through at least one power shift transmission stage, at least during the shift process.

It is particularly preferred if the first and/or second clutch device are each a friction clutch. The third clutch is preferably designed so that in a closed shift position it can transfer torque through keyed engagement. The third clutch devices are preferably configured as claw clutches with or without synchronising devices.

A preferred torque transfer device or a preferred power shift transmission is designed so that the relevant transmission stages have a wheel mounted rotatable on the first or second shaft and which can be coupled rotationally secured to this shaft through a third clutch device. If a relevant shift stage or transmission stage is shifted which is also designated a gear stage or gear, the relevant third clutch device is in a closed shift position. When shifting between different shift positions or transmission stages or gears all third clutch devices are opened at least temporarily. The first clutch device is during this shift process in an at least partially closed shift position so that torque can be transferred between the first and second shaft through the power shift transmission stage.

A control device is preferably provided which has the effect that the first clutch device can be shifted in different shift positions in which it can transfer different torque. The first clutch device is in particular designed so that it can slip.

Preferably the first clutch device is controlled so that it transfers at least temporarily a torque when the old gear stage is still engaged, and at least temporarily transfers a torque when the new gear stage is just engaged. The length of the corresponding time periods can go down to nil and is particularly preferred so that it is ensured that torque is transferred without interruption between a motor vehicle drive device and a vehicle drive axle.

The first clutch device and second clutch device are preferably connected in series, namely in particular so that through the power shift transmission stage torque can only be transferred between the vehicle drive device and the vehicle drive axle when both the first clutch device and the second clutch device is shifted in a closed shift position. The first clutch device is thereby preferably facing the drive axle and the second clutch device preferably facing the drive device of the vehicle.

The first and second clutch device are preferably connected in parallel so that through the second clutch device torque can be transferred from the vehicle drive device to the drive axle when the second clutch device is opened.

The second clutch device is preferably configured as a start-up clutch.

According to a preferred embodiment of the invention the power shift transmission stage has a greater transmission ratio than the gear transmission stage.

The power shift transmission stage is preferably designed so that through this transmission stage a torque can be transferred between a vehicle drive device and a vehicle drive axle even for a longer period.

Preferably a sixth gear is formed as a power shift transmission stage and a first to fifth gear as a gear transmission stage, or a fifth gear as a power shift transmission stage and a first to fourth gear as gear transmission stage.

The first clutch device or second clutch device is formed as a depressed or self-sustaining clutch device. A depressed clutch device is preferably held in a substantially opened shift position through a spring device or the like when it is not loaded by the actuating device. A self-sustaining clutch device is preferably held in a substantially closed shift position through a spring device or the like when it is not loaded by the actuating device.

The first or second clutch device are preferably formed as a depressed clutch device and the other of these clutch devices is formed as a self-sustaining clutch device.

According to a preferred embodiment of the invention the first and second clutch device are operated by a common actuating device which in a first shift stage acts so that the second clutch device is closed, and in a second shift stage acts so that both the first and the second clutch device are closed and where applicable acts in a third shift stage so that the first and second clutch device are opened.

The first clutch device and second clutch device are preferably arranged in a common clutch housing.

The first and/or the second clutch device is preferably a self-adjusting clutch device.

According to a preferred embodiment of the invention a fourth overall elasticity of the release mechanism is aligned in the direction of the release path of the release mechanism.

According to a preferred embodiment of the invention the maximum release path of the first clutch device depends substantially on the fourth overall elasticity of the release mechanism. This fourth overall elasticity of the release device takes into account in particular the elasticity of a release lever, the elasticity of a clutch cover, as well as the elasticity of at least a clutch disc and/or at least a resetting spring which is preferably disposed parallel to the clutch disc or the clutch discs and is disposed between a stop and a contact pressure plate, so that the stop and contact pressure plate are loaded.

The release path of the release device and in particular the maximum release path of the first clutch device is preferably independent of the first elasticity of the first component part and/or the second elasticity of the second component part and/or the first and/or sixth overall elasticity of the actuating device and/or the second and/or fifth overall elasticity of the drive device and/or the third and/or seventh overall elasticity of the unit comprising the actuating device and the drive device.

The first overall elasticity of the actuating device depends in particular on the elasticities of the component parts which influence the force transfer behaviour of the actuating device, namely in particular along the force transfer path.

The second overall elasticity of the drive device preferably depends on the elasticities of the component parts which influence the force transfer behaviour of the drive device, namely in particular along the force transfer stretch of the drive device.

The third overall elasticity of the unit comprising the actuating device and the drive device depends in particular on the elasticities of the component parts of the drive device and the actuating device which influence the force transfer behaviour of this unit, namely in particular along the force transfer stretch.

The fifth overall elasticity of the drive device differs from the second overall elasticity of the drive device substantially in that the fifth overall elasticity of the drive device, as opposed to the second, substantially does not take into consideration the influence of the first (elastic) component part and/or the at least one elastic device on the overall elasticity of the drive device.

The sixth overall elasticity of the actuating device differs from the first overall elasticity of the actuating device substantially in that the sixth overall elasticity of the actuating device, as opposed to the first, essentially does not take into consideration the influence of the first (elastic) component part and/or the at least one elastic device on the overall elasticity of the drive device.

The seventh overall elasticity of the unit comprising the actuating device and the drive device differs from the third overall elasticity of the unit comprising the actuating device and drive device substantially in that the seventh overall elasticity, as opposed to the third, essentially does not take into consideration the influence of the first (elastic) component part and/or the at least one elastic device on the overall elasticity of the unit comprising the actuating device and the drive device.

The drive device and/or actuating device preferably has at least one transmission stage which acts in particular in the force transfer stretch of the drive device and/or actuating device.

The force-path-characteristics of the first component part or elastic device or component parts and devices which have an elasticity, can be designed degressive or linear or progressive, namely in particular in the direction of the force transfer stretch.

The drive device and/or actuating device and/or elastic device and/or first component part preferably have at least one spring device which is formed in particular as a mechanical and/or pneumatic and/or hydraulic and/or electric and/or electromagnetic spring device.

The spring device can have a coil spring or plate spring or magnetic coil and/or magnet and/or torsion spring or other spring device.

A damping device is preferably connected in parallel or in series with at least one of these spring devices.

Preferably the actuating device is designed at least in part as a hydraulic device and has a piston cylinder mechanism wherein preferably the piston or the cylinder of this piston cylinder unit is loaded by a spring device and wherein the spring force of this spring device in particular counteracts the load applied by the drive device, namely in particular in the direction of the force transfer stretch.

The spring device loading this piston or cylinder is preferably formed as a coil spring or plate spring. The spring device can be disposed inside or outside the cylinder. According to a preferred embodiment of the invention the spring device is supported on one side on the piston surface of the piston and on the other side inside the cylinder against this cylinder.

According to a preferred embodiment a plate spring is disposed on an end face of the piston which is remote from the inner space of the cylinder and is loaded by a hydraulic fluid.

The actuating device preferably has a hydraulic stretch wherein a hydraulic pipe branching off from a hydraulic line which is disposed along the force transfer stretch is arranged substantially outside of the force transfer stretch, and wherein in this branching hydraulic pipe there is a piston or piston cylinder assembly whose piston is biased by the hydraulic fluid against the force of a spring device.

According to a preferred embodiment of the invention inside the drive device or inside the actuating device there is a device loaded in the rotational direction wherein the rotary movement is counteracted by the force of a spring device. The spring device can be a torsional spring or can have a number of coil springs which are arranged in the circumferential direction of the rotationally mounted device.

The first and/or second clutch device are preferably path-controlled.

The object of the invention is further achieved through a control device for controlling a torque transfer device.

By the term "control" is meant in the sense of the present invention in particular "regulate" and/or "control" in the sense of the DIN. The same applies regarding the terms derived from "control".

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

Since the subjects of the sub-claims can form independent and proper inventions in respect of the prior art known on the priority date the applicant reserves the right to make them the subject of independent claims and partial declarations. They can also contain independent inventions which have a configuration independent of the subjects of the preceding sub-claims.

The embodiments are not to be regarded as a restriction of the invention. Rather within the scope of the present disclosure numerous modifications and amendments are possible, particularly those variations, elements and combinations and/or materials which e.g. through a combination or modification of individual features or elements or method steps described in connection with the general description and embodiments as well as claims and are contained in the drawings can be drawn on by the expert with a view to solving the problem posed by the invention and which through a combination of features lead to a new subject or new method steps or sequence of method steps, where they relate to manufacturing, test and work processes.

BRIEF DESCRIPTION OF THE DRAWING FIGURES

The invention will now be explained in further detail with reference to the embodiments which are given by way of example and are not restricting.

Figure 11:
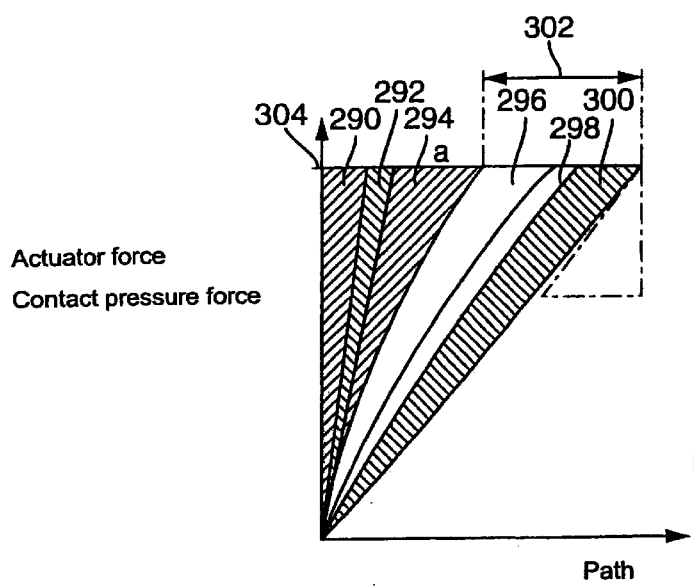
Figure 12:
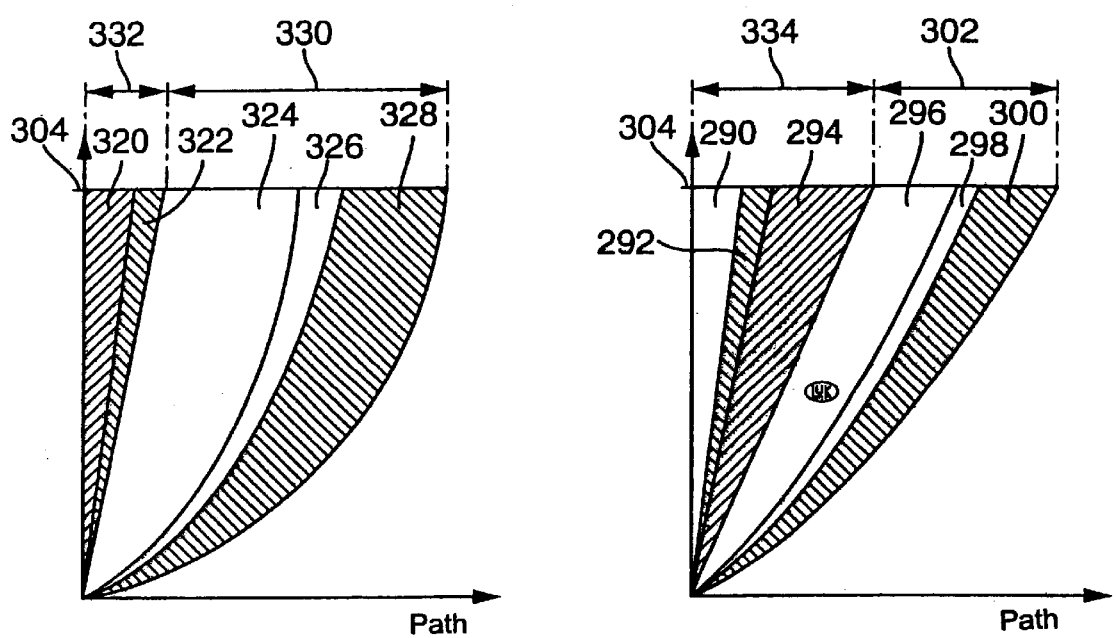

FIG. 11 shows a second force path diagram which shows by way of example the elasticities of different devices of a torque transfer device according to the invention; and FIG. 12 shows contrasting views of a force path diagram of a torque transfer device known to the applicant and of the torque transfer device according to the invention in which the elasticities of the different component parts or devices of this torque transfer device are clearly apparent.

DETAILED DESCRIPTION OF PREFERRED EMBODIMENTS

Figure 1:
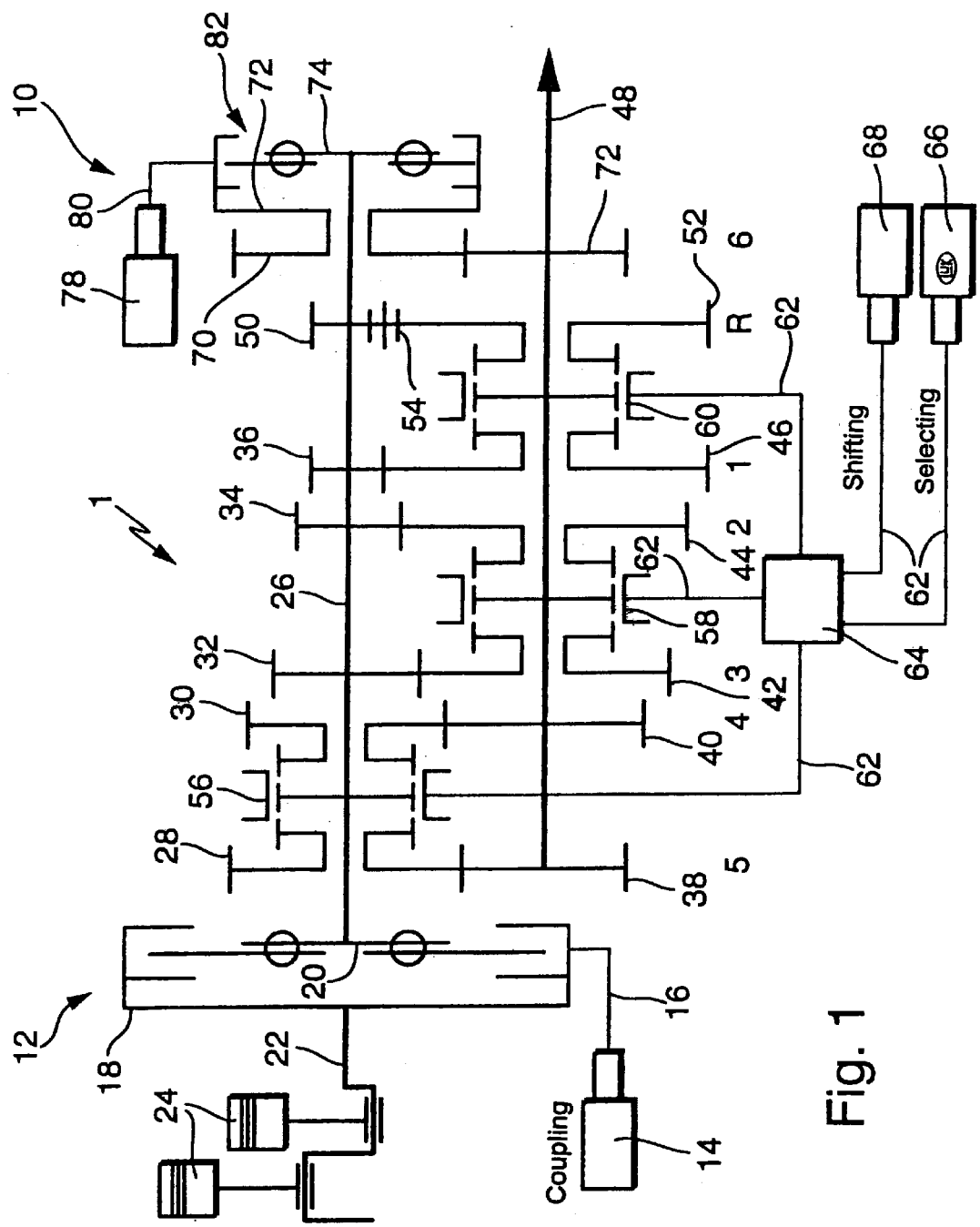
FIG. 1 shows a first embodiment by way of example of the invention in diagrammatic partially sectional view.

FIG. 1 shows a first embodiment of the invention in diagrammatic view.

The torque transfer device 1 has a first clutch device 10 and a second clutch device 12.

The second clutch device 12 has a drive device 14 as well as an actuating device 16 coupled thereto and shown in marked diagrammatic form. The drive device 14 can load the actuating device 16 which in turn can cause the second clutch device 12 to be shifted into different shift positions. These shift positions are designed so that in at least a first shift position a torque can be transferred between the input part 18 and the second clutch device 12 and the output part 20 of the second clutch device 12 and in at least one second shift position the input part 18 is uncoupled from the output part 20 so that between these parts 18, 20 there can be no torque transfer. Where necessary in at least a third shift position of the second clutch device 12 a restricted torque can be transferred between the input part 18 and the output part 20. This means in particular that a torque introduced into the second clutch device 12 is completely transferred insofar as this torque is less than a predetermined limit torque. If the torque introduced into the second clutch device 12 is greater than this predetermined limit torque then only this predetermined limit torque is transferred. The second clutch device 12 is a friction clutch so that the second clutch device 12 slips when a torque introduced in a third shift position is greater than the predetermined limit torque.

The second clutch device 12 has in particular, but not shown in more detail, a stop coupled to the input part 18 as well as a contact pressure plate. At least one clutch disc is mounted in the axial direction between this stop and this contact pressure plate and is coupled to the output part 20 or is the actual output part. More particularly the clutch disc is coupled on the output side through a spring and/or damper device and under predetermined conditions can transfer torque through this spring and/or damping device.

The second clutch device 12 is a self-sustaining start-up clutch so that the second clutch device 12 is shifted substantially in a closed shift position when it is not actuated or is not loaded by the actuating device.

The input part 18 of the second clutch device 12 is coupled to a crankshaft 22 of a vehicle which is loaded by an internal combustion engine whose cylinders 24 are shown diagrammatically.

The output part 20 of the second clutch device 12 is coupled to a first shaft 26—where necessary through a spring and/or damper device—and can transfer torque at least in part to this first shaft 26.

Several wheels 28, 30, 32, 34, 36 are disposed on the first shaft 26, each associated with a transmission stage or gear stage and in this case are spur wheels. Each of these wheels 28, 30, 32, 34, 36 engages in a wheel 38, 40, 42, 44, 46 which is mounted on a second shaft 48. The second shaft 48 is mounted parallel to the first shaft 26. The wheel pairings 28-38, 30-40, 32-42, 34-44, 36-46 respectively are each associated with a transmission stage or a gear stage, namely preferably in this sequence the fifth to first gear. In the embodiment according to FIG. 1 these transmission stages or gear stages are arranged on the first 26 or second shaft 48 so that the highest of these gear stages faces the second clutch device 12 or the internal combustion engine (not shown) and the transmission stage of the first gear is mounted on the output side or faces a drive axle of a motor vehicle with torque transfer device 1 wherein between the first and fifth gear stage the remaining gear stages are arranged in numerical sequence.

Each of these gear stages 28-38, 30-40, 32-42, 34-44, 36-46 has a spur wheel 28, 30, 42, 44, 46 which is mounted rotatable on the first 26 or second shaft 48. Another wheel or the other wheel 38, 40, 32, 34, 36 of these transmission stages is mounted rotationally secured on each other of these shafts 26, 48 respectively. These rotatably mounted spur wheels 28, 30, 42, 44, 46 are in particular mounted on the first 26 or second shaft 48 so that at least one further rotatably mounted spur wheel 28, 30, 42, 44, 46 is mounted adjoining each of these rotatably mounted spur wheels 28, 30, 42, 44, 46.

A further spur wheel 50 mounted on the first shaft 26 and a further spur wheel 52 mounted on the second shaft 48 is associated with a further transmission stage or gear stage.

A further toothed wheel 54 is connected in between these toothed wheels 50, 52 wherein the toothed wheel 50 engages in the toothed wheel 54 and the toothed wheel 54 engages in the toothed wheel 52. The effect of this interposed toothed wheel 54 is that the rotational direction of the toothed wheels 50, 52 is identical or that with the same rotational direction of the first shaft the rotational direction of the second shaft with the switched transmission stage 50-54-52 in comparison with the transmission stages 28-38, 30-40, 32-42, 34-44, 36-46 is opposite.

The transmission stages or gear transmission stages 28-38, 30-40, 32-42, 34-44, 36-46 are in particular designed as forward gears whilst the transmission or gear stage 50-54-52 is designed as reverse gear. The power shift transmission stage mentioned below likewise preferably acts as forward gear.

The spur wheel 52 of the reverse gear stage or transmission stages 50-54-52 is mounted rotatable on the second shaft and the spur wheel 50 is mounted rotationally secured on the first shaft 26.

Adjacent the spur wheels 28, 30, 42, 44, 46, 52 of the gears or gear stages or transmission stages 28-38, 30-40, 32-42, 34-44, 36-46 or 50-54-52 mounted rotatable on the first 26 and second shaft 48 respectively are third clutch devices 56, 58, 60 which can each be shifted into different shift positions. By means of these third clutch devices 56, 58, 60 it is possible to couple the spur wheels 28, 30, 42, 44, 46, 52 which are mounted movable on the first 26 and second shaft 48 respectively to the relevant shaft 26, 48 in a rotationally secured manner.

In the illustration according to FIG. 1 the spur wheels 28, 30, 32, 44, 46, 52 which are mounted rotatable on the first 26 and second shaft 48 respectively, as well as the third clutch devices 56, 58, 60 are each designed and arranged so that the third clutch devices 56, 58, 60 are each mounted between two rotatably mounted spur wheels of the transmission stages and in different shift positions can couple each one of these each adjoining spur wheels to the relevant shaft 26, 48 whereby these third clutch devices 56, 58, 60 can be shifted in particular in each one further shift position in which they couple none of the adjoining spur wheels 28, 30, 42, 44, 46, 52 mounted rotatable on the first 26 and second shaft 48 respectively to the said first 26 or second shaft 48.

It is thus proposed in particular that the third clutch devices 56, 58, 60 are each associated with two spur wheels of the transmission stages.

The third clutch devices 56, 58, 60 are actuated or shifted by an actuating device 62 which if necessary has a transmission stage 64. The actuating device 62 is loaded by a drive device which has a first electric motor 66 as well as a second electric motor 68.

The actuating device 62 is designed so that in the event of load through the first electric motor 66 the actuating device can be shifted into a shift position from which each one predetermined gear stage can be engaged and this predetermined gear stage can be engaged through the second electric motor 66.

Preferably the actuating device 62 or a predetermined component part (not shown) of the actuating device 62, such as shift shaft, when shifting into a predetermined shift position from which a gear can be engaged, during the so-called selection, on the one hand, and on shifting into a predetermined gear stage, during the so-called shifting, on the other hand, can be moved or loaded in different directions. These different movement or load directions are in particular each caused through one of the different electric motors 66, 68. These different motion or load directions can be for example in the case of a shift shaft such that this is loaded or moved in the circumferential direction on the one hand and in the axial direction on the other.

Between the first shaft 26 and the second shaft 48 is a further transmission stage which has a wheel 70 mounted rotatable on the first shaft and formed here as a spur wheel, as well as a wheel 72 mounted rotationally secured on the second shaft 48. This transmission stage 70-72 is designed as a power shift transmission stage. The transmission ratio of the power shift transmission stage is designed so that it is greater than the transmission ratios of the gear stages. The power shift transmission stage 70-72 is mounted on the output side of the gear transmission stages 28-38, 30-40, 32-42, 34-44, 36-46, 50-52.

The spur wheel 70 of the power shift transmission stage mounted rotationally movable on the first shaft 26 is coupled rotationally fixed to the output part 72 of the first clutch device 10. The input part 74 of the first clutch device 10 is coupled rotationally secured to the first shaft 26. The first clutch device 10 formed as a friction clutch can be shifted into different shift positions by means of a drive device 78 as well as an actuating device 80 whereby in a first shift position the input part 74 is substantially uncoupled from the output part 72 and is coupled in at least a further shift position and is designed in at least one further shift position so that torque can be transferred in part, thus in particular restricted to a predetermined value, between the input part 74 and the output part 72 of the first clutch device 10. To this end the drive device 78 of the first clutch device 10 generates a drive signal and transfers this to the actuating device 80 of the first clutch device 10 which in dependence on the drive signal generates an actuating force with which the release mechanism 82 is loaded.

The release mechanism 82 of the first clutch device 10 is shifted into different shift positions in dependence on the drive signal or actuating force.

According to the invention it is proposed that the elasticity of the unit comprising the drive device 78 and actuating device 80 amounts to at least 50% of the elasticity of the release mechanism 82.

The gear transmission stages 28-38, 30-40, 32-42, 34-44, 36-46 as well as 50-54-52 as well as the power shift transmission stage 70-72 are mounted between the first clutch device 10 and the second clutch device 12, seen in the axial direction of the first shaft 26.

According to one aspect the torque transfer device according to the invention functions as follows:

If a motor vehicle with torque transfer device 1 according to the invention is to be operated in a predetermined gear stage, and a shift process between different gears is not initiated or is terminated, thus between the first and second shaft a torque is to be transferred through the transmission stage 28-38, or 30-40 or 32-42 or 34-44 or 36-46 or 50-54-52, then the second clutch device 12 is in a closed shift position and the first clutch device 10 is in an open shift position. Thus torque is transferred from the crankshaft 22 to the input part 18 of the second clutch device 12. Since the second clutch device 12 is in a closed shift position this torque is passed on—at least in part—to the first shaft 26.

One of the third clutch devices 56, 58, 60 connects one of the rotationally mounted spur wheels 28, 30, 42, 44, 46, 52 rotationally secured to the first 26 or second shaft 48. The remaining of these third clutch devices 56, 58, 60 are shifted in an open position so that the remaining rotationally mounted toothed wheels can rotate on the shaft 26 or 48.

In the following it is assumed by way of example that as starting transmission stage, thus as the transmission stage from which at a later point in time a shift will be made into another transmission stage, the transmission stage of the first gear is shifted so that from the first shaft 26 a torque is transferred through the spur wheel 36 to the spur wheel 46 and from this spur wheel 46 through the closed third clutch device 60 to the second shaft 48.

Since the first clutch device 10 is shifted in an opened shift position the torque from the first shaft 26 which loads the input part 74 of the first clutch device 10 is not transferred through the first clutch device 10 to the output part 72 of the first clutch device 10 and thus the spur wheel 70 of the power shift transmission stage 70-72 so that the spur wheel 72 of the power shift transmission stage mounted on the second shaft 48 is substantially not loaded by the spur wheel 70 of the power shift transmission stage mounted on the first shaft 26.

If it is to be shifted into a different gear stage, here it may be assumed that it is to be shifted into the gear stage of the third gear, a signal is sent from a control device (not shown) to the first drive device 78. This signal has the effect that the clutch device 10 is closed at least in part. The concrete shift position of the first clutch device 10 which is initially controlled by the control device or drive device 78 or actuating device 80 depends in particular on predetermined characteristic values. Such characteristic values can in particular be the engaged gear stage of the output gear, thus here the gear stage of first gear, or the transmission of this gear stage or the shaft on which the third clutch device of the output gear is mounted or the speed or torque of the first 26 or second shaft 48 or the like.

The controlled shift position of the first clutch device 10 or release mechanism 82 of this third clutch device 10 is in particular designed so that it has the effect that the third clutch device 60 can be shifted into a shift position in which no torque is transferred between the toothed wheel 46 of the output gear or—here—the first gear stage and the third clutch device 60. This shift is designed so that all third clutch devices 56, 58, 60 are shifted in an opened shift position and a torque is transferred between the first shaft 26 and second shaft 48 only through the power shift transmission stage 70-72.

The first clutch device 10 or the release mechanism 82 of the first clutch device is then controlled so that the torque transferred from this release mechanism 82 or this first clutch device 10 between the first shaft 26 or input part 74 of the first clutch device 10 and the output part 72 of the first clutch device 10 or toothed wheel 70, or the transferred power or the speed of the first shaft 26 or the speed of the second shaft 48 is such that it enables the transmission stage 32-42 of the target gear—thus here the third gear—to be shifted by means of a third clutch device 58 without this third clutch device 58 and this toothed wheel 42 which is to be coupled with this third clutch device 58 having to be synchronised by means of synchronisation rings or the like.

The target gear is then shifted. For the example where the target gear is third gear, the third clutch device 58 is shifted so that it connects the toothed wheel 42 mounted rotatable on the second shaft 48 to this second shaft 48 in rotationally secured manner.

The first clutch device 10 is then opened again so that the torque between the first shaft 26 and the second shaft 48 is transferred completely through the target gear stage, thus here the transmission stage 32-42 of third gear.

Figure 2:
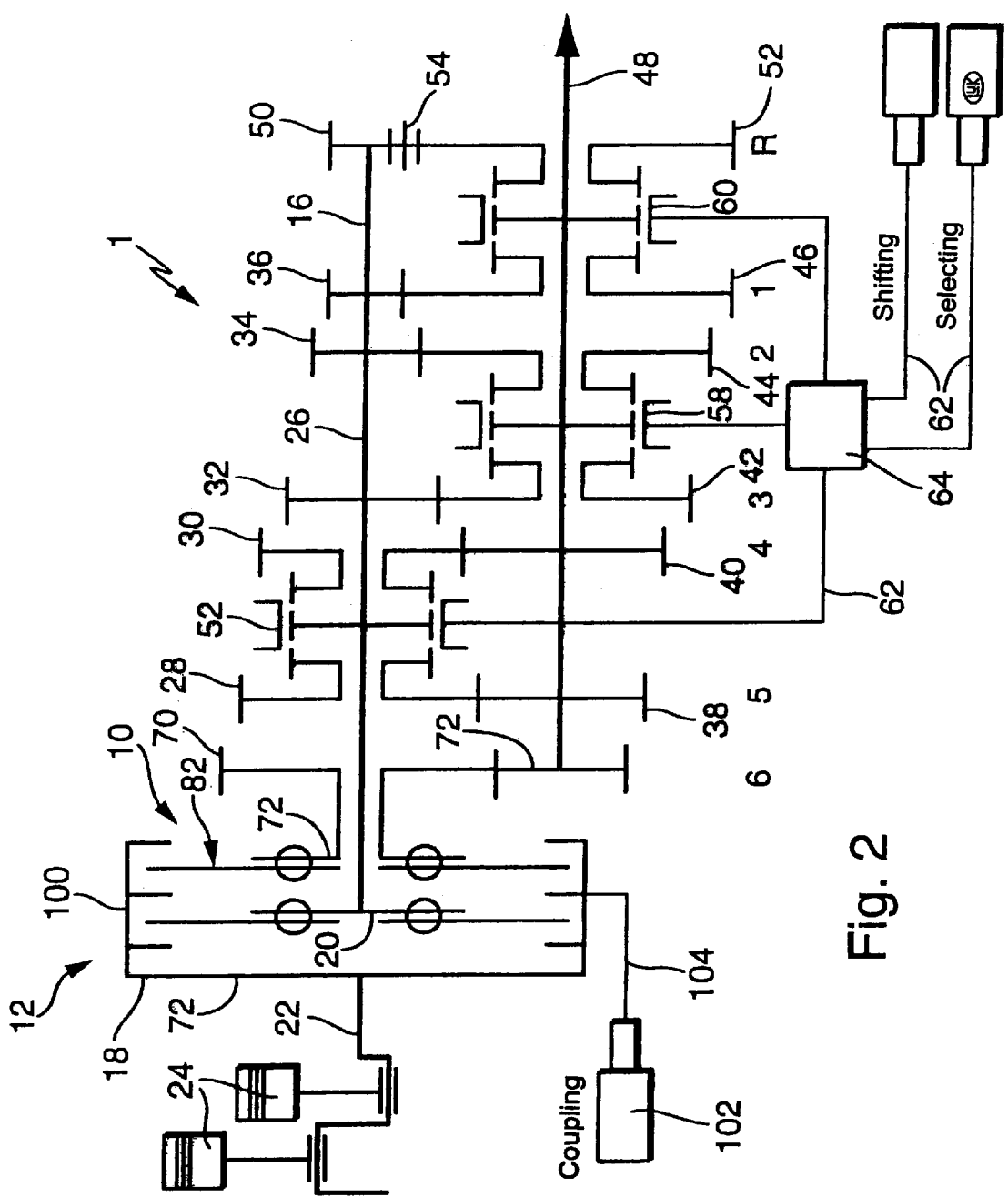
FIG. 2 shows a second embodiment by way of example of the invention in diagrammatic partially sectional view.

The embodiment according to FIG. 2 differs from the embodiment according to FIG. 1 in particular in that the first clutch device 10 and the second clutch device 12 are mounted on the input side of the power shift transmission stage 70, 72 as well as on the input side of the gear stages 28-38, 30-40, 32-42, 34-44, ,36-46, 50-52. Furthermore the first clutch device 10 as well as the second clutch device 12 are mounted in a common clutch housing 100. Furthermore a common drive device 102 as well as a common actuating device 104 is provided for the first clutch device 10 as well as the second clutch device 12.

The elasticity of this drive device 102 as well as this actuating device 104 is designed so that the elasticity of the unit comprising the drive device 102 as well as the actuating device 104 in the direction of the force transfer stretch amounts to at least 50% of the elasticity of the release mechanism 82 in the direction of the force transfer stretch.

Figure 3:
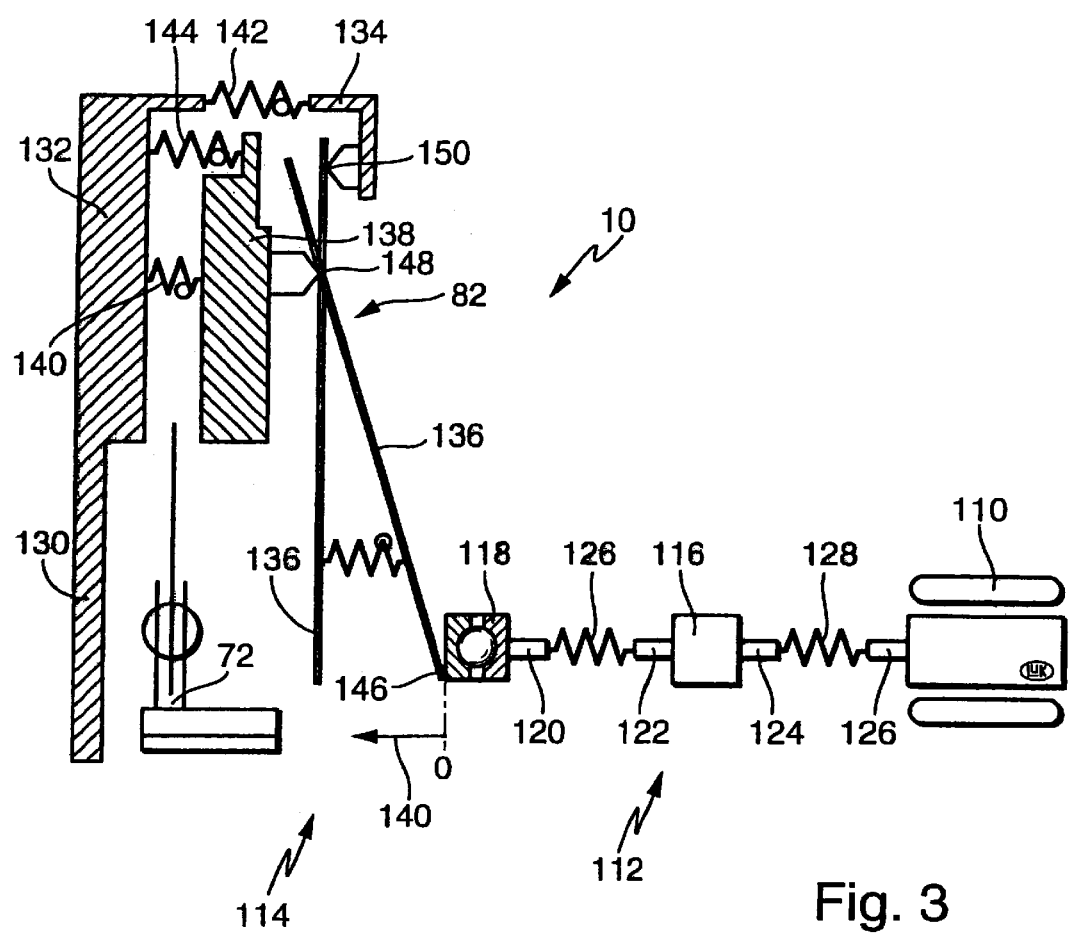
FIG. 3 shows a third embodiment by way of example of the invention in diagrammatic partially sectional view.

FIG. 3 shows an embodiment of a first clutch device 10 according to the invention by way of example with a drive device 110, an actuating device 112 as well as a release device 114.

The drive device 110 is an electric motor.

The actuating device 112 is shown in marked diagrammatic form.

The actuating device has a transmission stage 116, a release bearing 118 as well as component parts 120, 122, 124. The elasticities of the drive device and its component parts are shown in diagrammatic form through the springs 126, 128.

The first clutch device 10 has an input part 130, which has a stop 132, as well as a clutch cover 134.

The clutch device 10 furthermore has an output part 72. The contact pressure plate 138 can be displaced relative to the stop 132 or relative to the clutch disc which is designed elastic and is therefore represented as a spring 140, through a release lever 136 which is shown in FIG. 3 in two different shift positions and which can be loaded by the actuating device 112. The release lever 136 is supported against the contact pressure plate 138 as well as against the clutch cover 134. The clutch cover 134 has in the direction of the release path which is shown diagrammatically by the arrow 140, an elasticity which is shown diagrammatically by the spring 142.

A resetting spring 144 has the effect that the clutch disc is relaxed or the contact pressure plate 138 is moved back towards its starting position when the release lever 136 is relaxed or the load exerted by the released lever 136 on the contact pressure plate 138 is reduced. The clutch disc is coupled rotationally secured to the output part 72.

The release mechanism 82 has in particular the release lever 136, the clutch cover 134 as well as the clutch disc.

According to the invention it is proposed that the elasticity of the unit comprising the drive device 110 and actuating device 112 amounts to at least 50% of the elasticity of the release mechanism 82, namely in particular in the direction of the force transfer stretch. It should be noted that the elasticities of the release mechanism 82 are in particular the elasticities which influence the maximum release path wherein the release path strictly speaking can also be an engagement path.

By elasticity which is given in the direction of the force transfer stretch is meant in particular the elasticity which is given between predetermined load engagement points. With the release lever loaded by torque the decisive elasticity is in particular that which is given between the force engagement point 146 in the region of the release bearing and the force engagement point 148 in the region of the contact pressure plate or between one of these points 146, 148 and the force engagement point 150 on the clutch cover, namely in particular in the direction of the forces or initiated and forwarded forces or in the direction of the force transfer stretch in the region of the force introduction and force forwarding. With this release lever loaded by torque the elasticity in the direction of the lever axis is thus not absolutely decisive.

Figure 4:
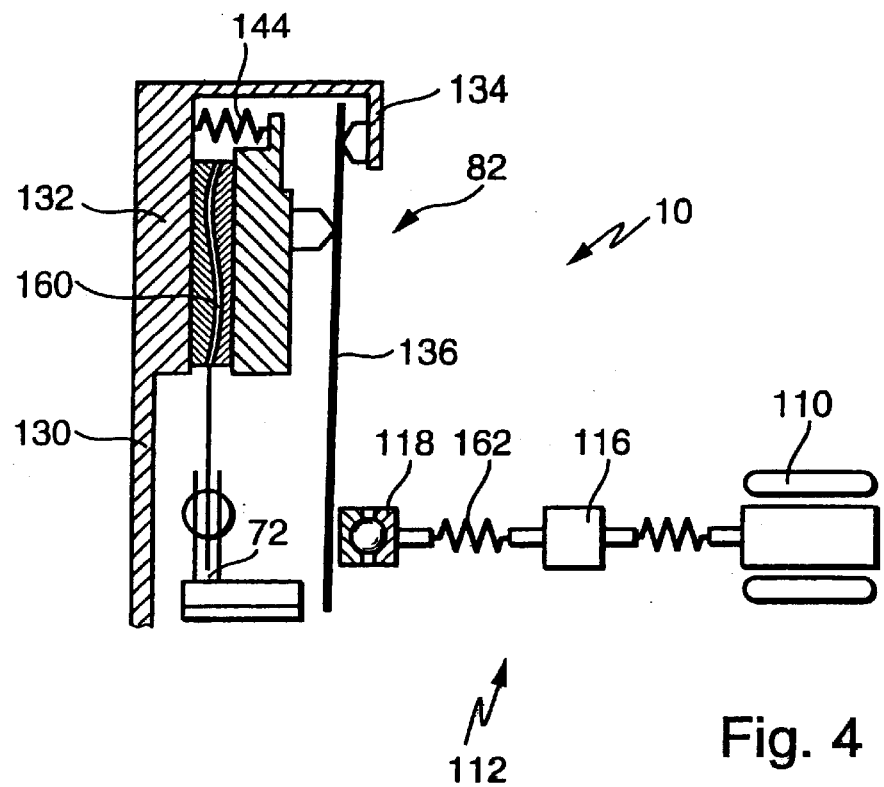
FIG. 4 shows a fourth embodiment by way of example of the invention in diagrammatic partially sectional view.

FIG. 4 shows an embodiment by way of example of the torque transfer device 10 according to the invention wherein in this illustration according to FIG. 4 compared to the illustration according to FIG. 3 the clutch disc 160 is shown not as a diagrammatic spring, but as a clutch disc and wherein the elasticities 142, 126, 128 are not shown.

In the actuating device 112 between the release bearing 118 and a transmission stage 116 there is an elastic device 162 which has the effect that the elasticity of the unit comprising the drive device 110 and actuating device 112 amounts to at least 50% of the elasticity of the release mechanism 82. This elastic device 162 is in particular a device which serves substantially only to increase the elasticity of the operating stretch or actuating device 112 and otherwise could be replaced by another component part such as a rigid component part wherein if necessary then the release device would be designed elastically. It is thus in particular proposed that the release device has compared to the known devices a reduced elasticity whilst the actuating device 112 and/or the drive device 110 has an increased elasticity.

Figure 5:
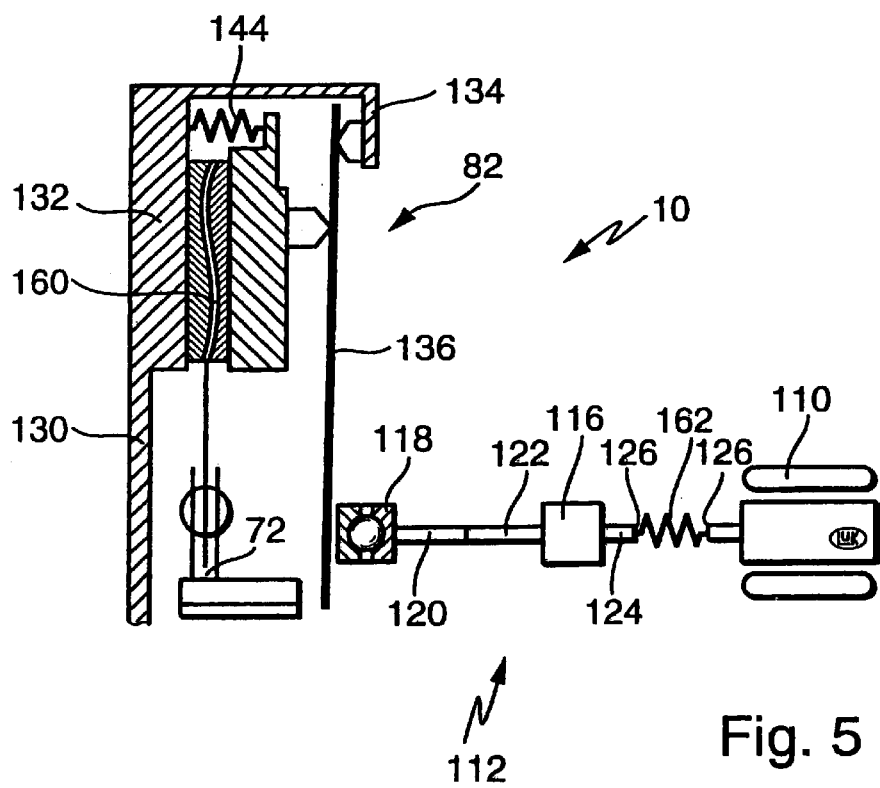
FIG. 5 shows a fifth embodiment by way of example of the invention in diagrammatic partially sectional view.

FIG. 5 shows an embodiment of the invention by way of example which differs from the illustration according to FIG. 4 substantially in that the elastic device is mounted between the transmission stage 116 and the drive device 110.

Figure 6:
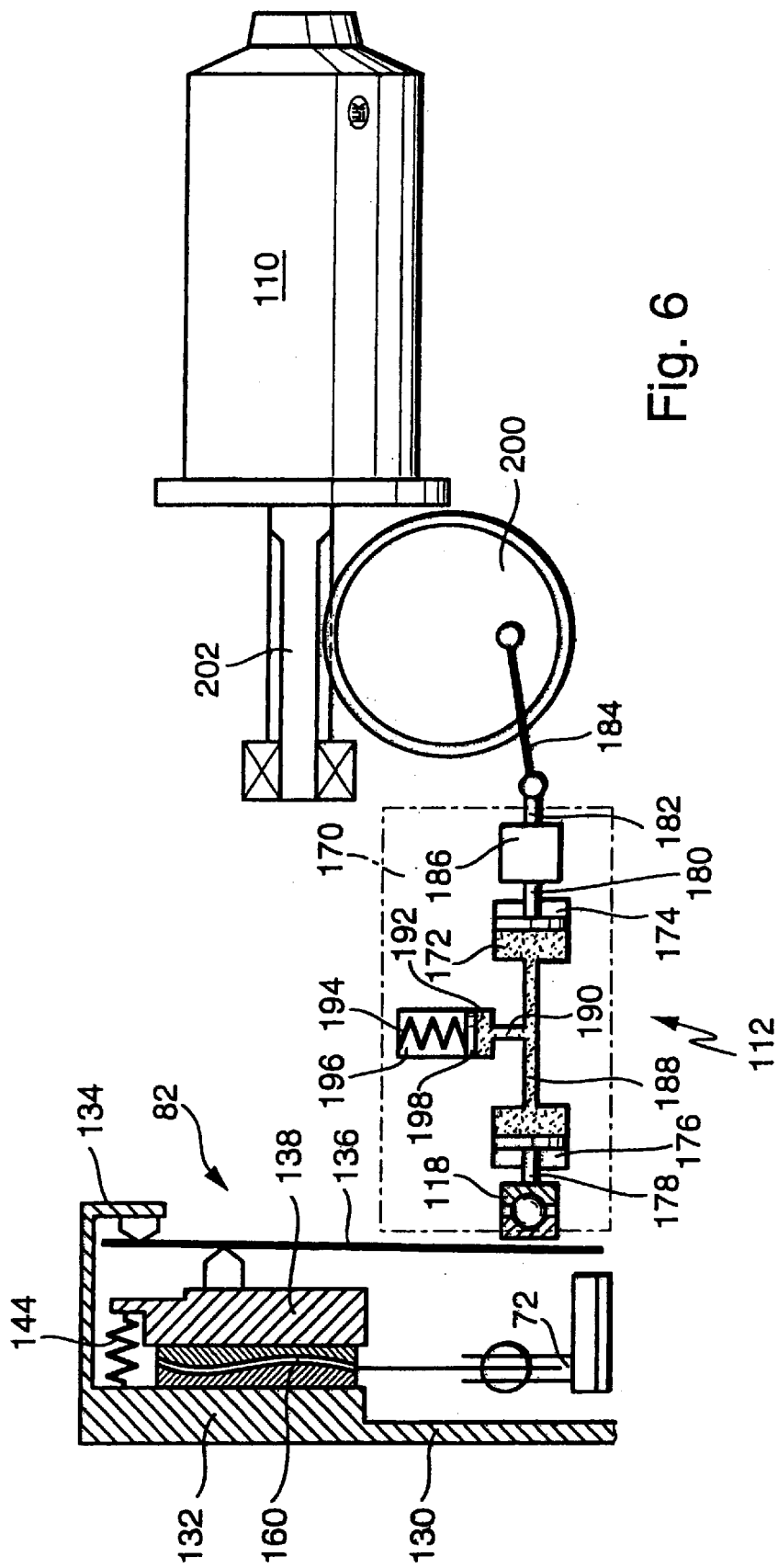
FIG. 6 shows a sixth embodiment by way of example of the invention in diagrammatic partially sectional view.

FIG. 6 shows an embodiment of the invention by way of example in diagrammatic form whose release mechanism 82 is designed substantially as was described with reference to FIGS. 4 and 5.

The actuating device 112 of the third clutch device has a hydrostatic stretch 170 which has a master cylinder 172, a master piston 174, a slave cylinder 176 as well as a slave piston 178. The master piston is loaded by mechanical components 180, 182, 184 wherein a transmission stage 186 is arranged where necessary in the region of these components. The master cylinder 172 is connected to the slave cylinder 176 through a hydraulic pipeline assembly 188. Inside this hydraulic pipeline assembly a pipeline 190 branches off and opens into a cylinder 192. Inside this cylinder is a spring device or elastic device 194 which is tensioned between a wall 196 of the cylinder 192 and a piston mounted inside the cylinder 192. The mechanical component parts 180, 182, 184 are coupled to a rotatably mounted component part 200. This rotationally mounted component part is loaded by an electric motor 110 or its output shaft 202. The rotational movement of this rotationally mounted component part 220 which is conditioned through the load by means of the electric motor 110 is converted into a substantially linear movement by means of the mechanical component parts 180, 182, 184. This linear movement or linear force acts on the master piston 174, and thus on the fluid in the hydraulic pipeline assembly 188. Thus the slave piston is loaded which through the adjoining component parts of the actuating device 112 acts on the release lever 136. An additional elasticity of the actuating stretch 170 or inside the actuating device 112 is effected in that a part of the hydraulic fluid loaded through the master piston 174 is compressed inside the hydraulic assembly 188 through the branch pipe 190 into the cylinder 192 whereby this movement of the hydraulic fluid is counteracted by the spring force of the spring device 194. It is hereby effected that the elasticity of the force transfer stretch inside the actuating device 112 is increased.

Figure 7:
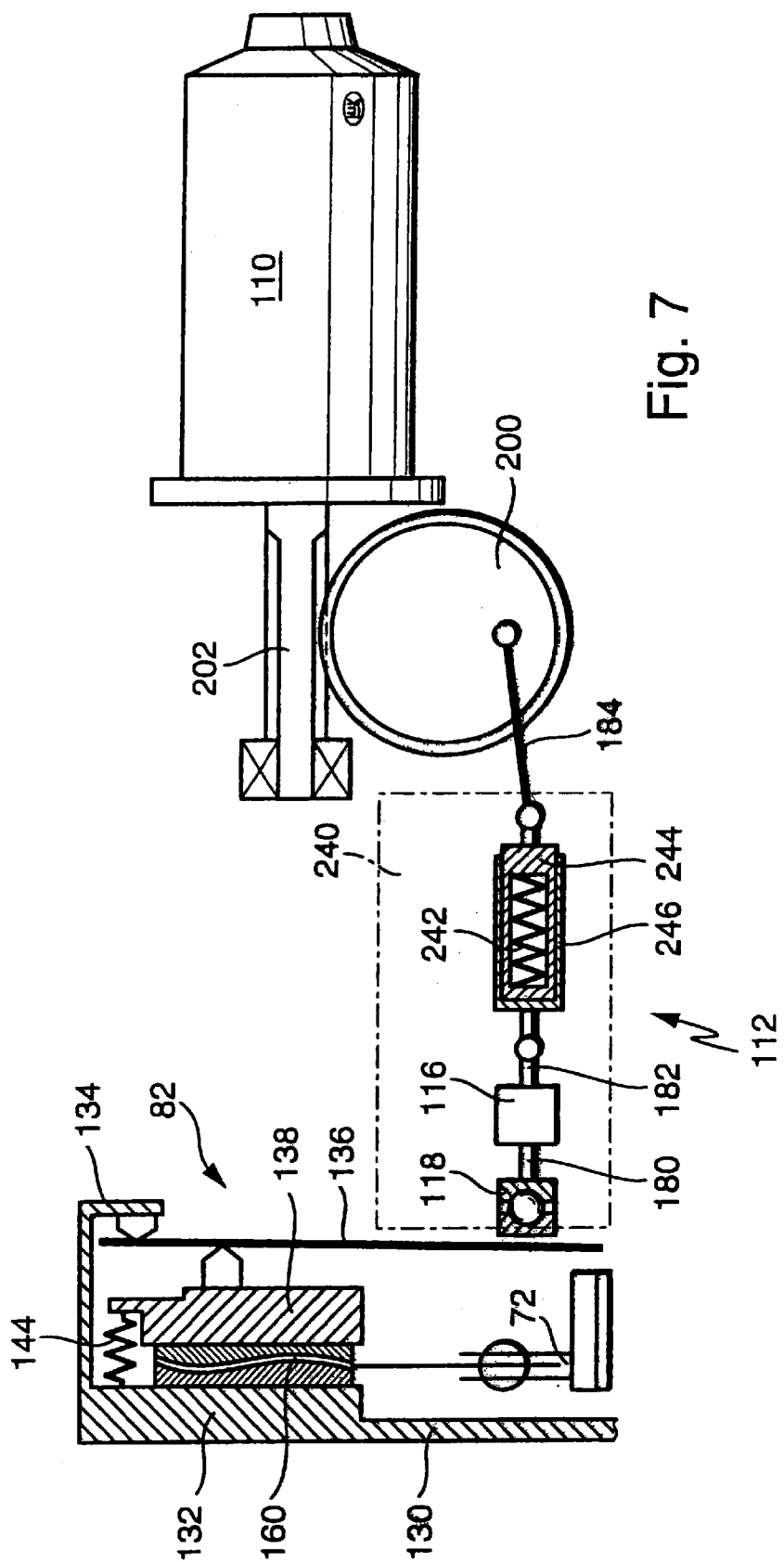
FIG. 7 shows a seventh embodiment by way of example of the invention in diagrammatic partially sectional view.

FIG. 7 shows an embodiment of the invention by way of example which differs from the embodiment according to FIG. 6 through the configuration of the actuating device 112.

The actuating device 112 has a mechanical stretch 240 within which a spring device 242 is provided. This spring device is in particular configured and arranged so that a piston 244 is connected to the cylinder 246 through the spring device 242.

This device 242, 244, 246 is in particular provided for the purpose of increasing the elasticity of the actuating device 112.

Figure 8:
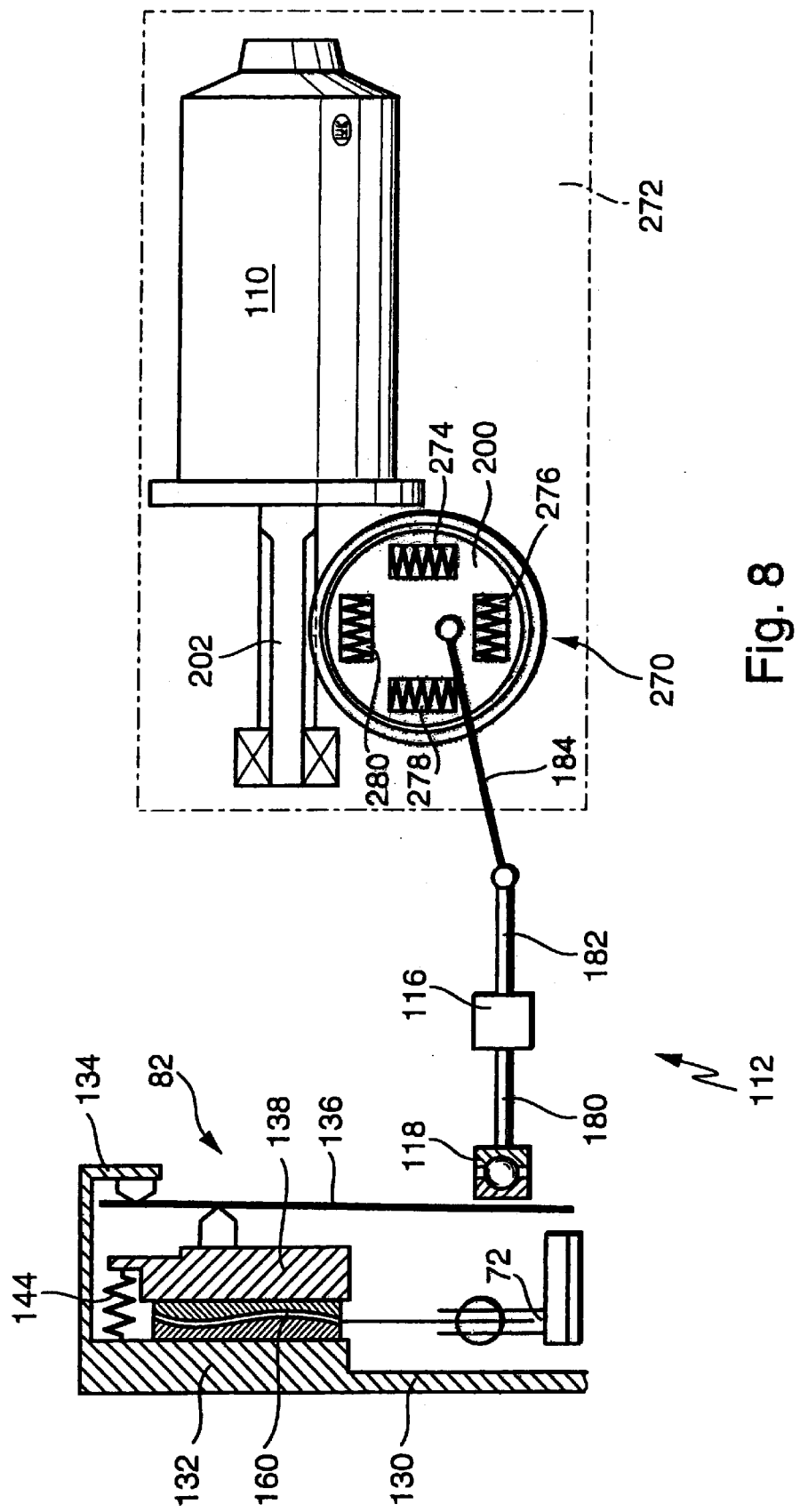
FIG. 8 shows an eighth embodiment by way of example of the invention in diagrammatic partially sectional view.

FIG. 8 shows an embodiment by way of example of a torque transfer device according to the invention in which an elastic device is provided inside the drive device 272 of the first clutch device 10. The drive device 272 has a device 200 mounted rotatable and loaded by an electric motor 110 and which is in particular a worm gear and to which a component part 184 is coupled which can convert the rotational movement of this rotationally mounted component part 200 into a linear movement of the component part 182. Spring devices 274, 276, 278, 280 are supported in the circumferential direction on this rotationally mounted device and have the effect that in the event of load through the electric motor 110 this load is counteracted by spring forces of the spring device 274, 276, 278, 280. The overall elasticity of the drive device 272 of the first clutch device 10 is thus increased.

The actuating device 112 is shown in marked diagrammatic form in FIG. 8.

The combinations of the elastic (additional) devices illustrated in FIGS. 6 to 8 are preferred according to the invention.

Figure 9:
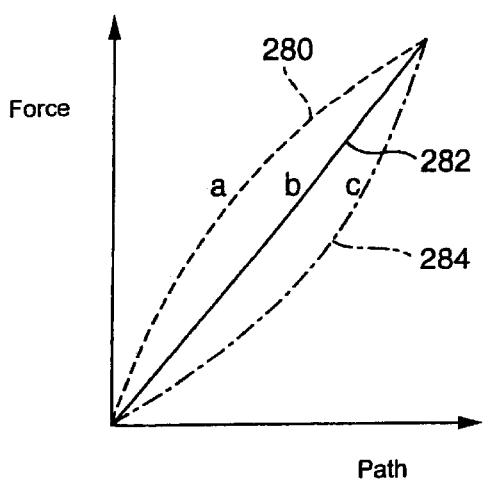
FIG. 9 shows examples of spring characteristics of an elastic device of the torque transfer device according to the invention.

FIG. 9 shows a force-path diagram of an elastic device of the actuating device and/or drive device which is provided according to the invention.

As the characteristic line 280 clearly shows the force-path behaviour of the elastic device can be degressive or as shown by the characteristic line 282 linear or as shown by the characteristic line 284 as progressive.

Figure 10:
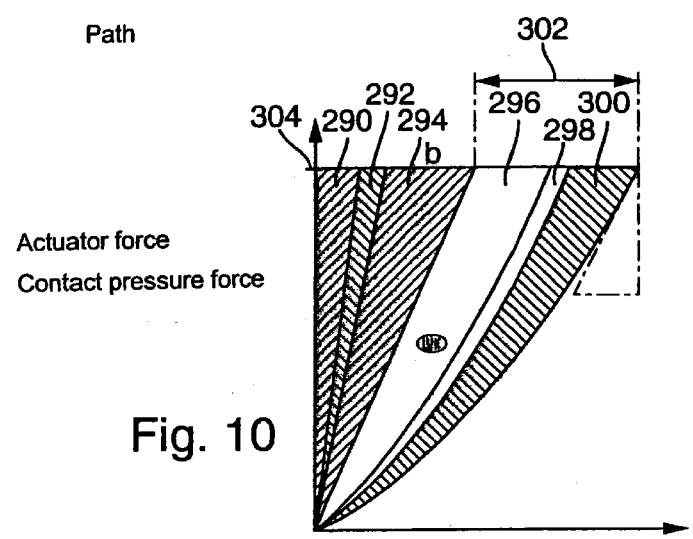
FIG. 10 shows a first force-path diagram which shows by way of example the elasticities of different devices of a torque transfer device according to the invention.

FIG. 10 shows by way of example the elastic behaviour of component parts of a torque transfer device according to the invention.

The right boundary line of the relevant fields is each time a force-path characteristic line of a device relating to the left boundary line of these relevant fields.

The field 290 shows the elasticity of the drive device. The field 292 shows the elasticity of the stretch of actuating device. The fields 290, 292 hereby do not take into account the elasticity of additional elastic elements inside the drive or actuating device.

The field 294 shows the elasticity of an (additional) elastic device which is mounted in the actuating device and/or release mechanism.

The elasticity of this additional elastic device is preferably greater than the elasticity of the drive device or the elasticity of the actuating device or the elasticity of the unit comprising the drive device and actuating device.

The field 296 shows the elasticity of the release lever and the field 298 the elasticity of the clutch cover 134. The field 300 shows the elasticity of the clutch disc or the unit comprising the clutch disc and resetting spring of the release mechanism.

In FIG. 10 the force produced by the drive device or the drive force of the release mechanism or the force with which the actuating device loads the release lever is mounted on the vertical axis. The fields 290, 292, 294 show elasticities of the actuating and/or drive device. The fields 296, 298, 300 show elasticities of the release mechanism. The path 302 which is given in the event of maximum force 304 corresponds to the release path of the clutch device.

In the illustration given by way of example in FIG. 10 the elasticity of the clutch disc and the resetting spring is greater than the elasticity of the clutch cover 134. The elasticity of the clutch lever is likewise greater than the elasticity of the clutch cover 134. The elasticity of the clutch disc as well as the resetting spring or the unit comprising clutch disc and resetting spring is smaller or larger than the elasticity of the clutch lever. The elasticity of the elastic device which is mounted in the actuating device or the drive device is greater than the elasticity of the release lever as well as greater than the elasticity of the clutch cover 134 as well as greater than the elasticity of the unit comprising clutch disc and resetting spring.

The elasticity of the elastic device indicated by the field 294 is linear in the illustration according to FIG. 10.

FIG. 11 shows a force-path diagram which indicates the elasticities according to FIG. 10 wherein the elasticity of the elastic device indicated by the field 294 is here designed to be degressive.

It should be pointed out that through progressive characteristic lines or progressive elasticity behaviour, more particularly of the elastic device, it is possible to finely tune the overall system for lower torques whilst through degressive characteristics it is possible to finely tune the system to high torques.

The size ratios of the elasticities relate in particular to the elasticities which are given in the event of the maximum load with which the drive device loads the release mechanism during operation, and where applicable also to lower loads.

FIG. 12 shows corresponding to the illustrations of FIGS. 10 and 11 the elasticities of a known torque transfer device opposite those of a torque transfer device according to the invention wherein the right hand illustration corresponds substantially to the illustration of FIG. 10. The elasticity of the drive device of the known torque transfer device is indicated through the field 320. The elasticity of the elastic stretch or actuating device of the known torque transfer device is indicated through the field 322. The elasticity of the release lever of the known torque transfer device is indicated through the field 324. The elasticity of the clutch cover 134 of the known torque transfer device is indicated through the field 326. The elasticity of the clutch disc as well as the resetting spring of the known torque transfer device is indicated through the field 328.

As can be seen from comparing the illustrations according to FIG. 12 the known torque transfer device does not have an elasticity of an additional elastic device indicated by the field 294.

Consequently the elasticity of the known release mechanism which corresponds substantially to the release path 330 is clearly greater than the elasticity 332 of the unit comprising the drive device and actuating device in the event of maximum load 304.

As opposed to this with the same maximum load 304 the elasticity 334 of the unit comprising the actuating device and drive device is at least 50% of the elasticity of the release mechanism.

Consequently in the known release mechanism at maximum load 304 the release path 330 is clearly greater than the path displacement 332 moved in the drive device or actuating device.

In the torque transfer device according to the invention the path displacement effected in the actuating device as well as drive device at maximum load 304 is at least 50% of the release path 302.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

Since the subjects of the sub-claims can form independent and proper inventions in respect of the prior art known on the priority date the applicant reserves the right to make them the subject of independent claims and partial declarations. They can also contain independent inventions which have a configuration independent of the subjects of the preceding sub-claims.

The embodiments are not to be regarded as a restriction of the invention. Rather within the scope of the present disclosure numerals modifications and amendments are possible, particularly those variations, elements and combinations and/or materials which e.g. through a combination or modification of individual features or elements or method steps described in connection with the general description and embodiments as well as claims and are contained in the drawings can be drawn on by the expert with a view to solving the problem posed by the invention and which through a combination of features lead to a new subject or new method steps or sequence of method steps, where they relate to manufacturing, test and work processes.

What is claimed is:

1. A torque transfer device comprising at least one first clutch device which has at least one release mechanism, at least one actuating device and at least one drive device, wherein the release mechanism can be shifted into different shift positions;

the drive device generates at least one drive signal which is transferred to the actuating device;

the actuating device under predetermined conditions generates in dependence on the drive signal an actuating signal which is transferred to the release mechanism and under first predetermined conditions causes the release mechanism to be shifted into a different shift position, and under second predetermined conditions causes the release mechanism to be held in a predetermined shift position; and a first overall elasticity of the actuating device and/or a second overall elasticity of the drive device and/or a third overall elasticity of a unit comprising the actuating device and drive device is at least 50% of a fourth overall elasticity of the release mechanism.

2. A torque transfer device as defined in claim 1, wherein inside at least one of the actuating device and the drive device there is at least one elastic device which increases a the first overall elasticity of the actuating device and/or a the second overall elasticity of the drive device and/or a third overall elasticity of a the unit comprising the actuating device and drive device.

3. A torque transfer device as defined in claim 2, wherein a signal transfer stretch of at least one of the actuating device, drive device, first component part and elastic device is constructed so that it operates in at least one the following ways: hydraulically, pneumatically, electrically, electromechanically, mechanically, hydrostatically, hydrodynamically and electromagnetically.

4. A torque transfer device as defined in claim 1, wherein inside at least one of the actuating device and drive device there is at least a first component part or at least an elastic device arranged at least in part with an elasticity thereof being greater than the second overall elasticity of the drive device and/or the first overall elasticity of the actuating device and/or the third overall elasticity of a unit comprising the drive device and actuating device.

5. A torque transfer device as defined in claim 1, further comprising a second clutch device.

6. A torque transfer device as defined in claim 5, wherein the second clutch device is a start-up clutch.

7. A torque transfer device as defined in claim 5, wherein at least one of the first and second clutch devices is a friction clutch.

8. A torque transfer device as defined in claim 5, wherein at least one of the first and second clutch devices is a self-sustaining clutch device.

9. A torque transfer device as defined in claim 5, wherein the first and second clutch devices are arranged at least in part, in a common clutch housing or common clutch cover.

10. A torque transfer device as defined in claim 5, wherein the first and second clutch device can be actuated or shifted by the actuating device which is a common actuating device for the first and second clutch device.

11. A torque transfer device as defined in claim 1, wherein the first clutch device is a depressed clutch device.

12. A torque transfer device as defined in claim 1, further comprising a transmission device which can be shifted into different shift positions in which different transmission stages are shifted.

13. A torque transfer device as defined in claim 12, wherein at least one of the torque transfer and transmission devices has at least a third clutch device.

14. A torque transfer device as defined in claim 13, wherein the third clutch devices has a positive locking clutch which in regard to a predetermined load direction in at least one closed shift position connects at least two component parts in positive locking engagement and which has a claw clutch.

15. A torque transfer device as defined in claim 13, wherein the transmission device has several wheels wherein under predetermined conditions the torque transfer device or the transmission device transfers torque in different shift positions through different combinations of wheels.

16. A torque transfer device as defined in claim 15, wherein the transmission device has at least a first and at least a second shaft, between which different transmission stages can be shifted, which have at least in part different transmission ratios wherein one of these transmission stages mounted between the first and second shaft and which is designed in particular as a power shift transmission stage is designed so that one wheel of this transmission stage is mounted rotatable on the first shaft and can be coupled rotationally secured to this first shaft through the first clutch device and engages directly or indirectly in another wheel which is mounted rotationally secured on the second shaft; and at least another of these transmission stages mounted between the first and second shaft and designed as the gear transmission stage is designed so that one wheel of this transmission stage is mounted rotatable on the first or second shaft and can be coupled through a third clutch device rotationally secured with this first or second shaft and another wheel is mounted rotationally secured on the other of these two shafts wherein under predetermined conditions when the third clutch device is closed torque is transferred between the first and second shaft through this gear transmission stage in which the third clutch device engages.

17. A torque transfer device as defined in claim 15, wherein the third clutch device which in a closed shift position has the effect that under predetermined conditions a torque is transferred between the first and second shaft through a transmission stage mounted between the first and second shaft and which is in particular a gear transmission stage, as well as at least a first clutch device which is in particular a power shift clutch device which under preset conditions is shifted at least then in a closed shift position and enables torque transfer between the first and second shaft when the third clutch device is shifted substantially in an open position.

18. A torque transfer device as defined in claim 12, wherein at least one of the torque transfer device and the transmission device is a power shift transmission device which can be shifted under load into different shift stages in which different transmission ratios can be shifted.

19. A torque transfer device as defined in claim 12, wherein the first clutch device is a power shift clutch device which is actuated or shifted into a closed shift position when the transmission device is shifted into a different shift position.

20. A torque transfer device as defined in claim 1, wherein the fourth overall elasticity of the release mechanism is aligned in the direction of a signal transfer stretch of the release mechanism.

21. A torque transfer device as defined in claim 1, wherein the fourth overall elasticity of the release mechanism is aligned or acts in the direction of a release path of the release mechanism.

22. A torque transfer device as defined in claim 1, wherein a minimum or maximum release path of the first clutch device depends substantially on the fourth overall elasticity of the release mechanism.

23. A torque transfer device as defined in claim 1, wherein the first overall elasticity of the actuating device depends on the other elasticities and on the arrangement of the component parts which influence the signal transfer behaviour of the actuating device.

24. A torque transfer device as defined in claim 1, wherein the second overall elasticity of the drive device depends on the other elasticities and arrangement of the component parts which influence the signal transfer behaviour of the drive device.

25. A torque transfer device as defined in claim 1, wherein the third overall elasticity of the unit comprising the actuating device and drive device takes into account the other elasticities, and the arrangement of the component parts, which influence the signal transfer behaviour of the unit comprising the actuating device and drive device.

26. A torque transfer device as defined in claim 1, wherein the release mechanism has at least one of a clutch cover, a contact pressure plate, a stop, a release lever, a clutch disc and a resetting spring device.

27. A torque transfer device as defined in claim 1, wherein at least one of the drive and actuating devices has at least one gear stage which acts in the direction of a signal transfer stretch of the drive device and/or actuating device.

28. A torque transfer device as defined in claim 1, wherein the actuating device has a piston cylinder unit and at least one of the piston and cylinder of this piston-cylinder unit is loaded by a spring device wherein this spring device counteracts the load of the drive device.

29. A torque transfer device as defined in claim 1, wherein at least one of the actuating and drive devices has at least one component part which is located for signal transfer in the rotational direction wherein a spring force of a spring device acts against rotational movement of this component part in the direction of this rotational direction under predetermined conditions.

30. A torque transfer device as defined in claim 1, further comprising a release bearing as well as a release lever adjoining this release bearing, wherein this release lever as well as the component parts of the torque transfer device adjoining this release lever on the side of the release lever remote from the release bearing along the signal transfer stretch are component parts of the release mechanism and wherein this release bearing as well as the component parts of the torque transfer device adjoining this release bearing on the side of the release bearing remote from the release lever along a signal transfer stretch are component parts of the actuating device or drive device.

31. A torque transfer device comprising at least one first clutch device which has at least one release mechanism, at least one actuating device and at least one drive device, wherein the release mechanism can be shifted into different shift positions;

the drive device generates at least one drive signal which is transferred to the actuating device;

the actuating device under predetermined conditions generates in dependence on the drive signal an actuating signal which is transferred to the release mechanism and under first predetermined conditions causes the release mechanism to be shifted into a different shift position, and under second predetermined conditions causes the release mechanism to be held in a predetermined shift position; and inside at least one of the actuating device and drive device there is at least a first component part or at least an elastic device arranged at least in part with a first elasticity thereof being at least 120% of a second elasticity of at least one adjoining second component part which is different from the first.

32. A torque transfer device as defined in claim 31, wherein at least one of the elastic device and the first component part is constructed as a single piece.

33. A torque transfer device as defined in claim 31, wherein at least one of the elastic device and the first component part has a substantially fixed aggregate state at room temperature.

34. A torque transfer device as defined in claim 31, wherein the first elasticity of the first component part and/or the second elasticity of the second component part and/or an overall elasticity of the actuating device and/or an overall elasticity of the drive device and/or an overall elasticity of a unit comprising the actuating device and drive device is aligned in the direction of a signal transfer stretch of the actuating device or of the drive device.

35. A torque transfer device as defined in claim 31, wherein the release mechanism is formed only of the component parts whose elasticities influence or at least partially determine a minimum or maximum release path of this release mechanism.

36. A torque transfer device as defined in claim 31, wherein at least one of the actuating device, the drive device, the first component part and the elastic device is constructed so that it operates in at least one the following ways: hydraulically, pneumatically, electrically, electromechanically and mechanically.

37. A torque transfer device as defined in claim 31, wherein the first component part or elastic device are inside the drive device and wherein at least one of the first component part or the elastic device of the drive device, the actuating device, the drive device, the actuating device and the unit of drive device and actuating device has a depressive or linear or progressive force-path characteristic in the direction of a signal or force transfer stretch.

38. A torque transfer device as defined in claim 31, wherein at least one of the drive device, actuating device, the elastic device and the first component part has at least one spring device.

39. A torque transfer device as defined in claim 38, further comprising at least one damper device which is connected in parallel with at least one of the spring device, the actuating device, the elastic device and the first component part.

40. A torque transfer device as defined in claim 31, wherein the at least one elastic device, the at least one first component part and the at least one second component part are arranged and/or act at least in part in a first signal transfer stretch of the drive device and/or in a second signal transfer stretch of the actuating device.

41. A torque transfer device as defined in claim 31, wherein at least one of the elastic device and the first component part branches off from a transfer stretch wherein at least one of this elastic device and this first component part is connected to the transfer stretch.

42. A torque transfer device as defined in claim 31, wherein a signal transfer stretch of the actuating device is constructed at least in part so that it operates hydraulically wherein by means of a hydraulic fluid which is arranged in at least one first hydraulic chamber or at least a first hydraulic pipeline, force is transferred in the direction of the signal transfer stretch and wherein from this first hydraulic chamber or this first hydraulic pipeline at least one second hydraulic pipeline or at least one second hydraulic chamber branches off which in particular is disposed substantially outside of the signal transfer stretch and which includes the elastic device or an elastic medium.

43. A torque transfer device as defined in claim 42 wherein at least one of the elastic device and the elastic medium increases the first overall elasticity of the actuating device.

44. A torque transfer device as defined in claim 42, wherein at least one of the elastic device, the first component part and the elastic medium is provided substantially only to increase the first overall elasticity of at least one of the actuating and drive devices.

* * * * *